UNITED STATES PATENT OFFICE.

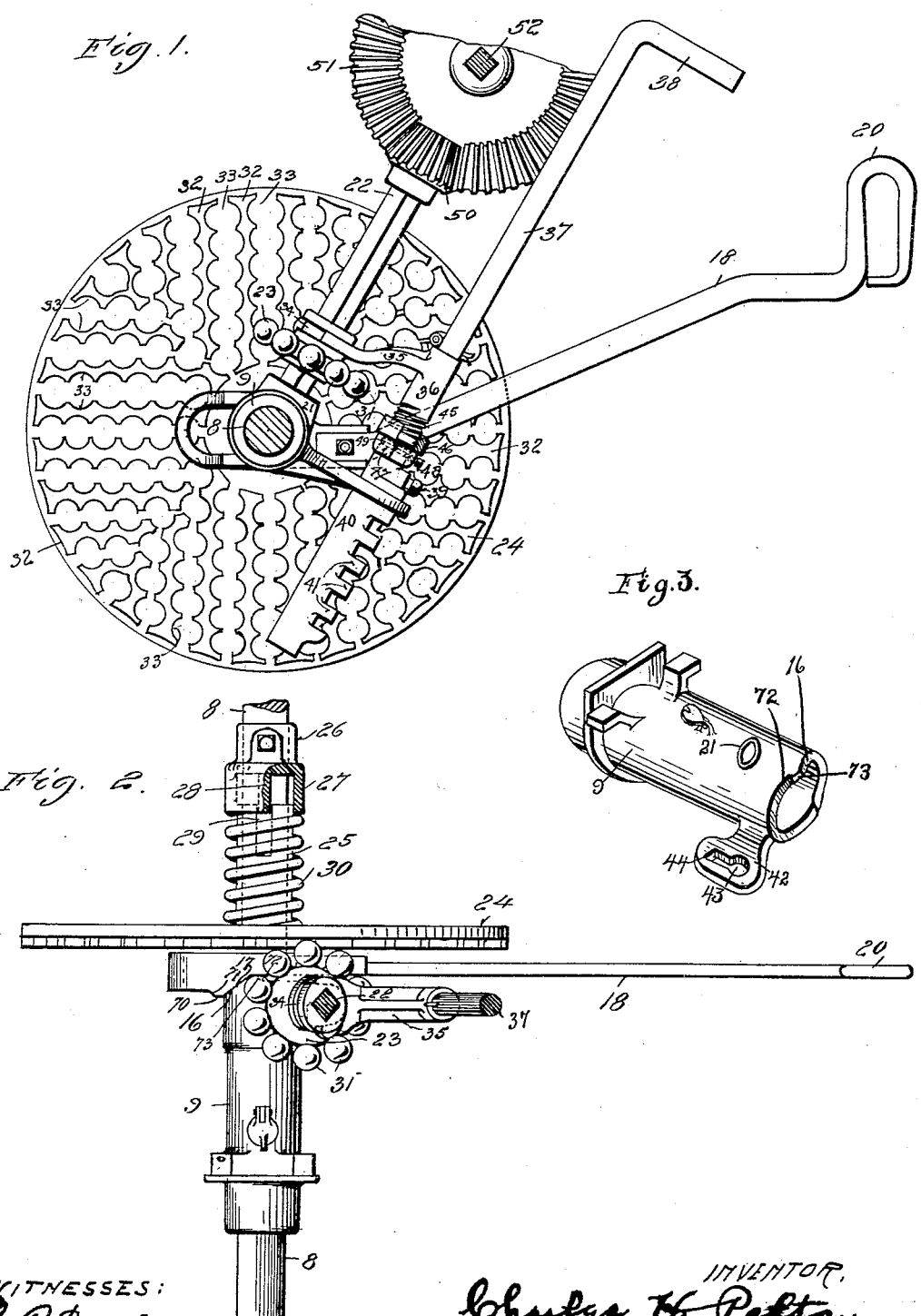

CHARLES H. PELTON, OF SPRINGFIELD, OHIO.

GEARING.

SPECIFICATION forming part of Letters Patent No. 704,094, dated July 8, 1902.

Application filed January 2, 1901. Serial No. 41,803. (No model.)

*To all whom it may concern:*

Be it known that I, CHARLES H. PELTON, a citizen of the United States, residing at Springfield, in the county of Clark and State of Ohio, have invented certain new and useful Improvements in Gearing, of which the following is a specification, reference being had therein to the accompanying drawings.

This invention relates to improvements in gearing, and has for its object to provide a change-speed gearing which shall be efficient in operation and in which the variable-speed driving disk may be used as a driving element when rotating in either direction.

The invention also has for its object to provide means whereby the gears may be readily thrown into and out of engagement with each other.

To these ends the invention consists in certain novel features which I will now proceed to describe and will then particularly point out in the claims.

In the accompanying drawings, Figure 1 is a side elevation, partly in section, of a gearing embodying my invention, the driving and driven shafts being shown in section. Fig. 2 is a plan section of the same, and Fig 3 is a detail perspective view of the fixed sleeve-bearing.

In the said drawings, 8 indicates a driving shaft or axle mounted in a stationary sleeve or bearing-box 9. The inner end of this box is provided with a beveled or inclined portion 16, which coöperates with a corresponding bevel or incline 17 on a bar 18, the forward end of which is slotted to fit over and be supported on the shaft or axle 8, upon which it may slide longitudinally. The bar 18 is provided with a suitable handle 20, by means of which it may be operated. At one end of the cam-incline on the bar 18 there is formed a projection 70, which is approximately V-shaped, as shown, one of its inclines forming a continuation or portion of the incline 17, while its other incline 71 extends in the opposite direction. At the opposite end of the incline on the box 9 there is formed a recess 72, corresponding to the projection 70 and having an inclined shoulder 73, against which the incline 71 may rest under certain conditions hereinafter pointed out. The box 9 is also provided with a boss 21, recessed to form a step-bearing for an upwardly-extending shaft 22, on which is mounted to slide longitudinally thereon a pinion 23, the pinion and shaft being caused to rotate together by any suitable means—as, for instance, by squaring that portion of the shaft on which the pinion slides and providing the pinion with a similarly-shaped aperture. Upon the shaft or axle 8 there is mounted adjacent to the pinion 23 and bar 18 a driving-disk 24, having an elongated hub 25, fitting loosely on the shaft or axle, so as to be slidable thereon longitudinally.

26 represents a collar secured on the shaft or axle and having a cylindrical flange 27, which extends over the end of the hub 25. A rib 28 on this flange engages a groove or slot 29 in the hub and causes the driving-disk 24 to rotate along with the shaft or axle. A spring 30, interposed between the collar 26 and disk 24, forces the disk normally toward the pinion 23 and bar 18.

It will be observed that the spring 30 not only surrounds the shaft or axle, but also the hub of the driving-disk, being exposed and not inclosed, as in Letters Patent No. 588,239, granted to me August 17, 1897, so that said spring is not only always accessible for inspection or any other purpose, but also may be made of sufficient size and strength to materially increase its efficiency and durability over the inclosed spring set forth in my said prior Letters Patent. It will be seen that when the bar 18 is moved rearward it will disengage the disk from the pinion and that when said bar is moved forward the spring 30 will cause the disk to reëngage the pinion 23, and thereby impart rotary motion to the shaft 22. It will also be observed that when the bar 18 is drawn back for the purpose of disengaging the disk and pinion the projection 70 seats itself within the recess 72, so as to lock the bar in this disengaging position, and thereby prevent the frictional contact of the rotating driving-disk from moving the bar backward, thus permitting the gears to reëngage. The bearing of the inclined shoulder 71 of the projection upon the inclined shoulder 73 of the recess is such, however, that a sharp forward push on the bar 18 will cause the projection 70 to slip out of the recess 72, thereby permitting the disk to reëngage the pinion in the manner just described.

The driving-disk 24 forms with the pinion 23 a variable-speed device, by means of which the speed of rotation of the shaft 22 relatively to that of the shaft or axle 8 may be changed, as desired, within certain limit. The pinion 23, it will be noted, is provided with spherical-shaped teeth 31. The driving-disk 24 is an improvement upon the disk set forth in Design Letters Patent No. 24,368, granted to me June 4, 1895. The disk shown in my earlier patent just referred to is capable of use only in connection with a pinion rotating in one direction, whereas my improved disk is adapted to rotate in either direction and may therefore be employed on either side of the pinion.

My improved gearing although capable of general use is more particularly devised for use in connection with agricultural implements—such as fertilizer-distributers and drills or seeders—and in machines of this character the driving-disk is generally fastened to the axle, so that it always rotates in the same direction. My improved driving-disk can be placed upon the axle at either end of a machine of this kind, with its working face directed outward or toward the adjacent ground-wheel, and will act as a driving-disk upon the pinion, whether it engages the pinion while moving in one direction or while moving in the opposite direction.

My improved reversible disk herein shown is provided upon its working face with a series of ribs 32, arranged generally in groups at right angles to each other, as shown, and each rib has on each of its faces or edges notches or recesses 33, which, in conjunction with the opposite notches of the adjacent ribs, form recesses with which the spherical teeth of the pinion 23 may engage in either direction, thereby adapting the driving-disk to be applied to either end of the axle with its working face outward.

The pinion 23 is movable longitudinally on the shaft 22 and radially with respect to the driving-disk, so that it may be caused to engage with circular rows of recesses farther from or nearer to the center of the disk, and thereby consequently diminish or increase the speed of the shaft 22 relatively to that of the shaft or axle. This movement of the pinion is accomplished by providing its hub with a groove 34, embraced by a forked arm 35, terminating in a sleeve 36, by means of which it is connected with an operating-rod 37, extending upward parallel with the shaft 22 and being provided with an operating-handle 38. In order to secure the operating-rod 37 in position after adjustment, its lower end has fastened to it, by means of a set-screw 39, a sleeve 40, provided with a series of teeth 41. This sleeve passes through a lug 42, formed on the box 9 and provided with an aperture 43 for the passage of the sleeve 40 and with a radial slot 44 for the passage of the teeth 41. The rod 37 is adapted to rotate within the sleeve 36, and by so turning said rod as to bring the teeth 41 in line with the slot 44 the rod may be moved up or down, as desired, carrying with it the pinion. After adjustment the rod may be locked by turning it so as to move the teeth out of line with the slot and causing said teeth to engage the upper and lower sides of the lug 42.

In order to cause the forked arm to move up and down with the rod, the lower end of the sleeve 36 is threaded, as indicated at 45, and there is screwed onto said threaded end a correspondingly-threaded collar 46, provided with a wrench-grasp 47 and connected with the sleeve 40 by means of a pin or screw 48, which extends into a groove 49 in the upper end of the sleeve 40. This pin-and-groove connection permits the rod 37 and sleeve 40 to rotate freely relatively to the sleeve 36 and at the same time insures that the sleeve 36 and the forked arm carried thereby will move longitudinally with the rod and its locking-sleeve. The threaded connection between the collar 46 and sleeve 36 permits the forked arm and pinion to be adjusted relatively to the locking-sleeve 40, so as to insure the proper engagement of the teeth of the pinion with the driving-disk when the teeth of the locking-sleeve are engaged with the lug 42.

The shaft 22 is provided at its upper end with a bevel-pinion 50, which meshes with a corresponding bevel-gear 51 on a shaft 52, which is the driven shaft and whose speed relatively to the driving shaft or axle 8 may be readily varied by means of the mechanism hereinbefore described.

Having thus fully described my invention, what I claim as new, and desire to secure by Letters Patent, is—

1. A driving-disk for fertilizer-distributers provided on its face with a plurality of ribs, each rib having recesses in its opposite sides, and the recesses of the adjacent ribs being located opposite each other, whereby concentric series of laterally-defined recesses are formed, substantially as described.

2. In a fertilizer-distributer, the combination, with an axle, of a driving-disk mounted thereon and provided with a plurality of ribs on its working face, each rib having recesses in its opposite sides, and the recesses of the adjacent ribs being opposite each other, whereby concentric series of laterally-defined recesses are formed, a shaft arranged at right angles to the axle and suitably connected with the feeding devices, and a pinion rotating with and slidable longitudinally on said shaft and provided with spherical teeth to engage the recesses of the driving-disk, substantially as described.

3. The combination, with a rotating axle, of a shaft at right angles thereto provided with a pinion, a driving-disk loosely mounted on the axle and provided with a hub having a longitudinal groove or slot, a collar fixed on the axle and having a longitudinal flange extending over the end of the hub of the disk and provided with a rib or key to enter the slot or groove thereof, an exposed spring surrounding the hub and bearing against the disk and collar, and means for moving the disk toward and from the collar, substantially as described.

4. In a variable-speed gear for fertilizer-distributers, &c., the combination, with a shaft, and a pinion rotating with and slidable on said shaft, of a shifting device for the pinion comprising an arm engaging the pinion and provided with a sleeve, a rod passing through said sleeve and adapted to rotate therein and to move the sleeve longitudinally, a second sleeve secured to the lower end of the rod and provided with teeth, and a fixed lug having an aperture to receive said last-mentioned sleeve and a radial slot for the passage of the teeth, said lug being of a thickness to engage between the teeth, substantially as described.

5. In a variable-speed gear for fertilizer-distributers, &c., the combination, with a driving-disk mounted to rotate with and move longitudinally of the axle and provided with concentric series of gear-teeth, of a shaft arranged at right angles to the axle, a pinion mounted to slide longitudinally of and rotate along with said shaft, a rod provided with an arm engaging said pinion, a fixed locking-lug, and an extension of said rod provided with locking-teeth to engage the locking-lug, the connection between said rod and its extension being adjustable, so that the locking-points may be adjusted to correspond to the engaging points of the pinion, substantially as described.

6. A variable-speed gear for fertilizer-distributers, &c., comprising an axle, a driving-disk mounted thereon and provided with concentric circular rows of gear-teeth, a shaft at right angles to the axle and having a pinion mounted to rotate therewith and slidable thereon, an arm engaging said pinion and provided with a sleeve threaded at its lower end, a rod passing loosely through said sleeve and provided with a locking-sleeve at its lower end, means for engaging said locking-sleeve at predetermined intervals, and a cap rotatably mounted on said locking-sleeve and threaded to engage the threaded lower end of the shifting arm-sleeve, substantially as described.

7. The combination, with a rotating shaft or axle and a fixed bearing therefor, of a driving-disk mounted to slide on and rotate with the axle, a spring to press said disk normally toward said fixed bearing, a shaft mounted in said fixed bearing and provided with a pinion adapted to slide thereon and rotate therewith, the fixed bearing being provided with a cam-incline and with a separate locking-recess at the end of the incline, and a longitudinally-sliding cam-bar interposed between the fixed bearing and the driving-disk and provided with a cam-incline to coöperate with that of the bearing, and with a separate locking projection at the end of said incline to engage with the locking-recess of the bearing, substantially as described.

In testimony whereof I affix my signature in presence of two witnesses.

CHARLES H. PELTON.

Witnesses:
IRVINE MILLER,
WM. O'LAUGHLIN.